United States Patent
Rajakumar et al.

(10) Patent No.: US 9,113,001 B2
(45) Date of Patent: Aug. 18, 2015

(54) SYSTEMS, METHODS, AND MEDIA FOR DISAMBIGUATING CALL DATA TO DETERMINE FRAUD

(75) Inventors: Anthony Rajakumar, Fremont, CA (US); Lisa Guerra, Los Altos, CA (US); Torsten Zeppenfeld, Emerald Hills, CA (US); Vipul Vyas, Palo Alto, CA (US)

(73) Assignee: Verint Americas Inc., Alpharetta, GA (US)

( * ) Notice: Subject to any disclaimer, the term of this patent is extended or adjusted under 35 U.S.C. 154(b) by 226 days.

(21) Appl. No.: 13/482,841

(22) Filed: May 29, 2012

(65) Prior Publication Data

US 2012/0263285 A1  Oct. 18, 2012

Related U.S. Application Data

(63) Continuation-in-part of application No. 13/290,011, filed on Nov. 4, 2011, now Pat. No. 8,793,131, which is a continuation-in-part of application No. 11/754,974, filed on May 29, 2007, now Pat. No.

(Continued)

(51) Int. Cl.
*H04M 15/00* (2006.01)
*H04M 3/22* (2006.01)
*G06Q 20/40* (2012.01)
*H04M 3/38* (2006.01)

(Continued)

(52) U.S. Cl.
CPC ........... *H04M 15/47* (2013.01); *G06Q 20/4016* (2013.01); *G10L 17/00* (2013.01); *H04M 3/2281* (2013.01); *G06F 21/32* (2013.01); *G10L 17/005* (2013.01); *G10L 17/22* (2013.01);

*H04M 3/385* (2013.01); *H04M 3/42059* (2013.01); *H04M 2201/40* (2013.01); *H04M 2201/41* (2013.01); *H04M 2203/6027* (2013.01); *H04M 2215/0148* (2013.01)

(58) Field of Classification Search
CPC ..................... H04M 15/47; H04M 2215/0148; H04M 2203/6027; H04M 2201/40; H04M 3/385; H04M 2201/41; H04M 3/42059; G10L 17/005; G10L 17/22; G06F 21/32
USPC .................................. 379/114.14, 88.02, 145
See application file for complete search history.

(56) References Cited

U.S. PATENT DOCUMENTS 4,653,097 A    3/1987 Watanabe et al.
5,805,674 A    9/1998 Anderson, Jr.

(Continued)

FOREIGN PATENT DOCUMENTS

EP         0598469 A2    5/1994
JP         2006038955    9/2006

(Continued)

*Primary Examiner* — Lisa Hashem
(74) *Attorney, Agent, or Firm* — Meunier Carlin & Curfman LLC (57) ABSTRACT

Systems, methods, and media for disambiguating call data are provided herein. Some exemplary methods include receiving, via a fraud notification system, notification of a fraud event associated with a customer account, the fraud event comprising a time stamp, determining, via a call selection module, unique voice samples or models from call events obtained within a time frame that is temporally proximate the fraud event, and generating a timeline presentation that includes each unique voice sample or model identified in the call events based upon a time stamp associated with the call events.

28 Claims, 6 Drawing Sheets

Related U.S. Application Data 8,073,691, application No. 13/482,841, which is a continuation-in-part of application No. 11/754,975, filed on May 29, 2007, now abandoned, and a continuation-in-part of application No. 12/352,530, filed on Jan. 12, 2009, now Pat. No. 8,924,285, and a continuation-in-part of application No. 12/856,200, filed on Aug. 13, 2010, and a continuation-in-part of application No. 12/856,118, filed on Aug. 13, 2010, now Pat. No. 8,930,261, and a continuation-in-part of application No. 12/856,037, filed on Aug. 13, 2010, now Pat. No. 8,510,215, and a continuation-in-part of application No. 11/404,342, filed on Apr. 14, 2006, which is a continuation-in-part of application No. 13/278,067, filed on Oct. 20, 2011, now Pat. No. 8,311,826, which is a continuation of application No. 11/754,974, filed on May 29, 2007, now Pat. No. 8,073,691, and a continuation-in-part of application No. 13/415,816, filed on Mar. 8, 2012, now Pat. No. 8,903,859, and a continuation-in-part of application No. 13/415,809, filed on Mar. 8, 2012, and a continuation-in-part of application No. 13/442,767, filed on Apr. 9, 2012.

(60) Provisional application No. 60/923,195, filed on Apr. 13, 2007, provisional application No. 60/808,892, filed on May 30, 2006, provisional application No. 61/197,848, filed on Oct. 31, 2008, provisional application No. 61/010,701, filed on Jan. 11, 2008, provisional application No. 61/335,677, filed on Jan. 11, 2010, provisional application No. 60/673,472, filed on Apr. 21, 2005.

(51) Int. Cl.
*H04M 3/42* (2006.01)
*G10L 17/00* (2013.01)
*G06F 21/32* (2013.01)
*G10L 17/22* (2013.01)

(56) References Cited

U.S. PATENT DOCUMENTS

| | | | |
|---|---|---|---|
| 5,907,602 A * | 5/1999 | Peel et al. | 379/114.14 |
| 5,999,525 A | 12/1999 | Krishnaswamy et al. | |
| 6,044,382 A | 3/2000 | Martino | |
| 6,145,083 A | 11/2000 | Shaffer et al. | |
| 6,266,640 B1 | 7/2001 | Fromm | |
| 6,427,137 B2 | 7/2002 | Petrushin | |
| 6,597,775 B2 * | 7/2003 | Lawyer et al. | 379/114.14 |
| 7,039,951 B1 | 5/2006 | Chaudhari et al. | |
| 7,106,843 B1 * | 9/2006 | Gainsboro et al. | 379/191 |
| 7,158,622 B2 * | 1/2007 | Lawyer et al. | 379/114.14 |
| 7,212,613 B2 | 5/2007 | Kim et al. | |
| 7,386,105 B2 | 6/2008 | Wasserblat et al. | |
| 7,539,290 B2 | 5/2009 | Ortel | |
| 7,657,431 B2 | 2/2010 | Hayakawa | |
| 7,668,769 B2 | 2/2010 | Baker et al. | |
| 7,778,832 B2 | 8/2010 | Broman et al. | |
| 7,822,605 B2 | 10/2010 | Zigel et al. | |
| 7,908,645 B2 | 3/2011 | Varghese et al. | |
| 7,940,897 B2 | 5/2011 | Khor et al. | |
| 8,036,892 B2 | 10/2011 | Broman et al. | |
| 8,112,278 B2 | 2/2012 | Burke | |
| 8,537,978 B2 * | 9/2013 | Jaiswal et al. | 379/88.02 |
| 2001/0026632 A1 | 10/2001 | Tamai | |
| 2002/0022474 A1 * | 2/2002 | Blom et al. | 455/410 |
| 2002/0099649 A1 | 7/2002 | Lee et al. | |
| 2003/0147516 A1 * | 8/2003 | Lawyer et al. | 379/114.14 |
| 2003/0208684 A1 | 11/2003 | Camacho et al. | |
| 2004/0029087 A1 | 2/2004 | White | |
| 2004/0111305 A1 * | 6/2004 | Gavan et al. | 705/7 |
| 2004/0131160 A1 | 7/2004 | Mardirossian | |
| 2004/0203575 A1 * | 10/2004 | Chin et al. | 455/404.1 |
| 2004/0240631 A1 | 12/2004 | Broman et al. | |
| 2005/0043014 A1 | 2/2005 | Hodge | |
| 2005/0125226 A1 | 6/2005 | Magee | |
| 2005/0125339 A1 | 6/2005 | Tidwell et al. | |
| 2005/0185779 A1 | 8/2005 | Toms | |
| 2006/0013372 A1 * | 1/2006 | Russell | 379/114.14 |
| 2006/0106605 A1 | 5/2006 | Saunders et al. | |
| 2006/0161435 A1 | 7/2006 | Atef et al. | |
| 2006/0212407 A1 | 9/2006 | Lyon | |
| 2006/0212925 A1 | 9/2006 | Shull et al. | |
| 2006/0248019 A1 | 11/2006 | Rajakumar | |
| 2006/0251226 A1 * | 11/2006 | Hogan et al. | 379/114.15 |
| 2006/0282660 A1 | 12/2006 | Varghese et al. | |
| 2006/0285665 A1 * | 12/2006 | Wasserblat et al. | 379/114.14 |
| 2006/0289622 A1 | 12/2006 | Khor et al. | |
| 2006/0293891 A1 | 12/2006 | Pathuel | |
| 2007/0041517 A1 | 2/2007 | Clarke et al. | |
| 2007/0074021 A1 | 3/2007 | Smithies et al. | |
| 2007/0124246 A1 * | 5/2007 | Lawyer et al. | 705/50 |
| 2007/0280436 A1 | 12/2007 | Rajakumar | |
| 2007/0282605 A1 | 12/2007 | Rajakumar | |
| 2008/0010066 A1 | 1/2008 | Broman et al. | |
| 2008/0195387 A1 * | 8/2008 | Zigel et al. | 704/236 |
| 2009/0046841 A1 | 2/2009 | Hodge | |
| 2009/0119106 A1 | 5/2009 | Rajakumar et al. | |
| 2009/0147939 A1 | 6/2009 | Morganstein et al. | |
| 2009/0247131 A1 * | 10/2009 | Champion et al. | 455/411 |
| 2009/0254971 A1 | 10/2009 | Herz et al. | |
| 2010/0228656 A1 | 9/2010 | Wasserblat et al. | |
| 2010/0303211 A1 | 12/2010 | Hartig et al. | |
| 2010/0305946 A1 | 12/2010 | Gutierrez | |
| 2010/0305960 A1 | 12/2010 | Gutierrez | |
| 2011/0026689 A1 * | 2/2011 | Metz et al. | 379/88.14 |
| 2011/0191106 A1 | 8/2011 | Khor et al. | |
| 2011/0255676 A1 | 10/2011 | Marchand et al. | |
| 2011/0320484 A1 * | 12/2011 | Smithies et al. | 707/769 |
| 2012/0072453 A1 * | 3/2012 | Guerra et al. | 707/776 |
| 2012/0253805 A1 | 10/2012 | Rajakumar et al. | |
| 2012/0284026 A1 * | 11/2012 | Cardillo et al. | 704/246 |
| 2013/0163737 A1 * | 6/2013 | Dement et al. | 379/201.01 |
| 2013/0197912 A1 * | 8/2013 | Hayakawa et al. | 704/246 |
| 2013/0253919 A1 | 9/2013 | Gutierrez et al. | |
| 2015/0055763 A1 * | 2/2015 | Guerra et al. | 379/88.02 |

FOREIGN PATENT DOCUMENTS

| | | |
|---|---|---|
| WO | 0077772 | 12/2000 |
| WO | 2006013555 | 2/2006 |
| WO | 2007001452 | 1/2007 |

\* cited by examiner

SYSTEMS, METHODS, AND MEDIA FOR DISAMBIGUATING CALL DATA TO DETERMINE FRAUD

CROSS-REFERENCE TO RELATED APPLICATIONS

This application is a continuation-in-part and claims benefit of and priority to U.S. patent application Ser. No. 13/290,011, filed on Nov. 4, 2011, now U.S. Pat. No. 8,793,131, entitled "SYSTEMS, METHODS, AND MEDIA FOR DETERMINING FRAUD PATTERNS AND CREATING FRAUD BEHAVIORAL MODELS," which is a continuation-in-part of U.S. patent application Ser. No. 11/754,974 filed on May 29, 2007, now U.S. Pat. No. 8,073,691, entitled "METHOD AND SYSTEM FOR SCREENING USING VOICE DATA AND METADATA," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006, entitled "Optimizations for a Fraud Detection System that uses Voiceprints."

This application is also a continuation-in-part and claims benefit of and priority to U.S. patent application Ser. No. 11/754,975, filed on May 29, 2007, now abandoned entitled "Method and System to Seed a Voice Database," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006, entitled "Optimizations for a Fraud Detection System that uses Voiceprints."

This application is also a continuation-in-part and claims benefit of and priority to U.S. patent application Ser. No. 12/352,530, filed on Jan. 12, 2009, now U.S. Pat. No. 8,924,285, entitled "BUILDING WHITELISTS COMPRISING VOICEPRINTS NOT ASSOCIATED WITH FRAUD AND SCREENING CALLS USING A COMBINATION OF A WHITELIST AND BLACKLIST," which in turn claims the benefit of and priority to U.S. Provisional Applications 61/197,848, filed Oct. 31, 2008, entitled "Voice biometrics based fraud management system," and 61/010,701, filed Jan. 11, 2008, entitled "Optimizations & extensions of a system to detected fraud using voiceprints."

This application is also a continuation-in-part and claims benefit of and priority to U.S. patent application Ser. No. 12/856,200, filed on Aug. 13, 2010, entitled "SPEAKER VERIFICATION-BASED FRAUD SYSTEM FOR COMBINED AUTOMATED RISK SCORE WITH AGENT REVIEW AND ASSOCIATED USER INTERFACE," which in turn claims the benefit of and priority to U.S. Provisional Application 61/335,677, filed on Jan. 11, 2010, entitled "Method for correlating fraud audio to textual fraud reports using word spotting."

This application is also a continuation-in-part and claims benefit of and priority to U.S. patent application Ser. No. 12/856,118, filed on Aug. 13, 2010, now U.S. Pat. No. 8,930,261, entitled "METHOD AND SYSTEM FOR GENERATING A FRAUD RISK SCORE USING TELEPHONY CHANNEL BASED AUDIO AND NON-AUDIO DATA," which in turn claims the benefit of and priority to U.S. Provisional Applications 61/335,677, filed on Jan. 11, 2010, entitled "Method for correlating fraud audio to textual fraud reports using word spotting." This application is also a continuation-in-part and claims benefit of and priority to U.S. patent application Ser. No. 12/856,037, filed on Aug. 13, 2010, now U.S. Pat. No. 8,510,215, entitled "METHOD AND SYSTEM FOR ENROLLING A VOICEPRINT IN A FRAUDSTER DATABASE," which in turn claims the benefit of and priority to U.S. Provisional Applications 61/335,677, filed on Jan. 11, 2010.

This application and each of the aforementioned Non-Provisional U.S. Patent Applications is a continuation-in-part and claims benefit of and priority to U.S. patent application Ser. No. 11/404,342, filed on Apr. 14, 2006, entitled "Method and system to detect fraud using voice data," which in turn claims the benefit of U.S. Provisional Application 60/673,472, filed on Apr. 21, 2005, entitled "Detecting Fraudulent Use of Financial Account Numbers Using Voiceprints."

This application is also a continuation-in-part and claims the benefit of and priority to U.S. patent application Ser. No. 13/278,067, filed on Oct. 20, 2011, now U.S. Pat. No. 8,311,826, entitled "Method and System for Screening Using Voice Data and Metadata," which in turn is a continuation of and claims the benefit of and priority to U.S. patent application Ser. No. 11/754,974, filed on May 29, 2007, now U.S. Pat. No. 8,073,691, entitled "METHOD AND SYSTEM FOR SCREENING USING VOICE DATA AND METADATA," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006 entitled "Optimizations for a Fraud Detection System that uses Voiceprints."

This application is also a continuation-in-part and claims benefit of and priority to U.S. patent application Ser. No. 13/415,816, filed Mar. 8, 2012, now U.S. Pat. No. 8,903,859, entitled "SYSTEMS, METHODS, AND MEDIA FOR GENERATING HIERARCHICAL FUSED RISK SCORES," U.S. patent application Ser. No. 13/415,809, filed Mar. 8, 2012, entitled "SYSTEMS, METHODS, AND MEDIA FOR DETERMINING FRAUD RISK FROM AUDIO SIGNALS," and U.S. patent application Ser. No. 13/442,767, filed Apr. 9, 2012, entitled "ENHANCED DIARIZATION SYSTEMS, MEDIA AND METHODS OF USE."

All of above applications and patents are hereby incorporated by reference herein in their entirety.

FIELD OF THE TECHNOLOGY

Embodiments of the disclosure relate to methods and systems for fraud detection. Systems and methods provided herein may be utilized to disambiguate or differentiate the call data of fraudsters from the call data of legitimate customers and to enroll fraudsters in a blacklist.

BACKGROUND

Fraud such as credit card fraud and identity fraud are common. To deal with fraud, enterprises such as merchants and banks use a variety of fraud detection systems. However, these fraud detection systems are susceptible to becoming obsolete within a short time because fraudsters change their methods of perpetrating fraud in order to maneuver past such fraud detection systems. A very common type of fraud is account take-over fraud. After a legitimate customer establishes a relationship with a merchant including one or more contacts by telephone, a fraudster takes over the account using information about the customer to impersonate the customer during additional contacts over the phone with the merchant. Unfortunately, even when the merchant detects that there has been a fraud, it can be difficult to determine which of multiple contacts originates from the fraudster.

SUMMARY

In some embodiments, a method for determining which of multiple telephone contacts originates from a legitimate customer and which of the contacts originate from a fraudster (disambiguation) includes selecting a time period close to when fraud is detected and collecting contacts or call events during that time period. Typically the call events include a time stamp and a voice sample along with other audio and non-audio data. Two or more speakers may be identified in the call event voice samples. The call events may be separated and grouped according to identified speakers. The call events may be displayed for analysis by a specialist. The specialist may use the speaker group identity and time stamps associated with the call events to determine which speaker is a fraudster and which is a legitimate customer. In some embodiments, a score may be displayed for the specialist indicating a likelihood that a speaker belongs to a particular group, a likelihood that the speaker is a fraudster and/or a likelihood that the speaker is a legitimate customer. Voices of suspected fraudsters may be compared to voice models of known fraudsters. A voice belonging to a fraudster may be enrolled into a fraudster database.

According to some embodiments, the present technology may be directed to methods for disambiguating call data. The method may include receiving, via a fraud notification module, notification of a fraud event including a customer account identifier and a fraud time stamp, and determining a time frame that is proximate the fraud time stamp. The method may further include collecting, using a call selection module, call events associated with the customer account identifier that occur during the determined time frame, each call event including a unique call event identifier, a voice sample, and a call event time stamp, and identifying, using a voice module, a first call event and call event timestamp associated with a first voice sample belonging to a first speaker, and a second call event and call event timestamp associated with a second voice sample belonging to a second speaker. The method may also include generating, using a user interface module, a visual timeline that includes the first call event and call event timestamp and an identification of the first voice sample as belonging to the first speaker, the second call event and call event timestamp and an identification of the second voice sample as belonging to the second speaker.

According to other embodiments, the present technology may be directed to a system for disambiguating call data. The system may include a memory for storing executable instructions that disambiguate call data, and a processor that executes the instructions. The system further includes a fraud notification module stored in memory that is executable by the processor to receive notification of a fraud event including a customer account identifier and a fraud time stamp, and a call selection module stored in memory that is executable by the processor to determine a time frame that is proximate the fraud time stamp, and collect call events associated with the customer account that occur during the determined time frame, each call event including a unique identifier, a voice sample, and a call event time stamp. A voice module stored in memory is executable by the processor to identify a first voice sample belonging to a first voice from collected call events and a second voice sample belonging to a second voice from collected call events, and a scoring module stored in memory is executable by the processor to a determine for the first and second voice a first and second voice score respectively, the first and second voice score each representing a probability of the respective voice being a fraudster.

According to additional embodiments, the present technology may be directed to non-transitory computer readable storage media having a program embodied thereon, the program being executable by a processor to perform a method for disambiguating call data. The method includes receiving notification of a fraud event associated with a customer account, the fraud event comprising a fraud time stamp and extracting a first voice model and a second voice model from voice samples in call events obtained within a time frame that is temporally proximate the fraud time stamp. The method further includes determining for each call event within the time frame if the voice sample matches the first voice model or the second voice model, and chart that includes for each call event within the time frame a column for a time stamp and a column for an indication that the voice sample matches the first voice model or the second voice model. In some embodiments, the chart includes a spreadsheet and the columns include a column for a score representing a match between the respective first and second voice samples and a voice model in a blacklist and/or a whitelist.

According to some other embodiments, the present technology may be directed to methods for disambiguating call data. The method includes receiving, via a fraud notification module, notification of a fraud event associated with a customer account, the fraud event comprising a time stamp and selecting, using a call selection module, call events occurring within a predetermined time based on the fraud time stamp, each call event including a voice model. The method further includes comparing, using a voice model comparator, the included voice models to a customer voice model associated with the customer account, and storing, in a fraudster database, included voice models that match the customer voice model.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Broadly speaking, the present technology may be directed to the disambiguation of call data to detect fraud. Fraudsters may perpetrate fraudulent actions against an enterprise via telephonic interaction with the enterprise. In various embodiments, an enterprise includes a merchant, financial institution, wireless carrier, an insurance company, an affiliate of a company, a bank, a telecommunication company, and/or any other business that a caller is interacting with. Two major types of fraud are new account fraud and account takeover fraud. In new account fraud, fraudsters attempt to establish a new account that can be used as a means for perpetrating fraudulent activities. Fraudsters may have many sets of identity information for use in establishing new accounts. Generally, in new account fraud only the fraudster calls the enterprise or financial institution.

In account takeover fraud, fraudsters attempt to gain control of an account that has been already established by a legitimate customer, that is, hack a legitimate customer account. Generally, both the legitimate customer and the fraudster call the enterprise at various times. Thus, the source of the calls as being from legitimate customers or fraudsters may be ambiguous. A variant of a takeover is a high value takeover, high net worth takeover or repeat takeover. In a high value takeover, fraudsters specialize in using an identity of a famous or high-net worth person over the phone. A few fraudsters repeatedly use the identity information attempt to impersonate this person and take over their account. Typically, an enterprise, particularly a merchant, does not wish to risk offending the person if it is a legitimate call.

When attempting to takeover or gain control of a legitimate account, the fraudster contacts the enterprise telephonically and engages with a customer service agent (or any other agent) to modify the account in such a way that the fraudster may use the account for fraudulent purposes. For example, the fraudster may attempt to change the billing address associated with the account to ensure that products are redirected to an address used by the fraudster. In another example of account takeover, the fraudster may utilize legitimate customer information to order goods/services. These fraudulent activities may also be referred to as account hacking. The customer information may be gleaned from various sources utilized by fraudsters to traffic in otherwise legitimate account information. Other types of fraudulent activities may be more subtle in their execution and manner of detection.

In new account fraud and/or account takeover fraud, a fraudster steals or otherwise gains access to identity information of a legitimate or famous customer and then uses the identity information to establish the account, and direct contact to an address used by the fraudster. A fraudster may illegally obtain information regarding a consumer by mail theft and may attempt to open an account using personally identifiable information of the consumer, included in the mail.

Regardless of the methods utilized to subvert an account and/or establish a fraudulent account using the name and identity information of a legitimate customer, when fraudulent activities are detected by the enterprise, data regarding the fraud activity may be stored as a fraud event, in a fraud report. Generally, fraud reports are assembled regularly by the enterprise, or by a third-party on behalf of the enterprise. The fraud report includes information about one or more fraud events. An account may be the subject of a fraud event in a fraud report. However, both a legitimate customer and a fraudster may have contacted the enterprise regarding the account.

Table 1 below illustrates a fraud report including a list of account numbers and time stamps for fraud events. Note that the same account may be the subject of multiple fraud activities, e.g., account number 5387 in Table 1. In various embodiments, the fraud events include information that indicates the type of fraud encountered, an approximate time the fraud occurred (fraud time stamp), number of fraudulent events, customer account number, and so forth.

TABLE 1

| Account Number | Time Stamp |
| --- | --- |
| 3468 | Jul 12, 14:14 |
| 5387 | Jul 13, 09:52 |
| 2134 | Jul 15, 15:22 |
| 5387 | Jul 21, 03:18 |

Table 1 illustrates a simple fraud report including only two columns. In various embodiments, data in Table 1 includes account number, time stamp, type of fraud, amount of fraud, name on the account, last shipping/billing address used, type of account, and recent account activity, and data associated with calls made into the call center regarding this account (such as call identifiers for call events linked to the account).

Table 2 illustrates a list of call events associated with a specific account number. Each of the rows in the example of Table 2 represents a specific call event. Data regarding the call event includes event identifiers and related audio and/or non-audio data. The rows collected for Table 2 include data from call events collected for account number 2134 in Table 1. Optionally, the data the rows are collected from call events occurring during a predetermined time period relative to the fraud report timestamp for account number 2134.

TABLE 2

| Call event identifier | Time Stamp | Speaker | Notes |
| --- | --- | --- | --- |
| 121310 | Jan 18 | Speaker 1 | Account Established |
| 132315 | Feb 13 | Speaker 1 | Customer Product Order Received Payments Received for Past Due Balance |
| 152325 | Mar 12 | Speaker 2 | Delivery Address Change Requested |
| 166330 | Apr 04 | Speaker 2 | Products Ordered |
| 179335 | Jun 30 | Speaker 1 | Customer provides fraud notice Agent notes that the customer is agitated |
| 188340 | Jul 28 | Speaker 2 | Products Ordered |

The column labeled "Call event identifier" includes a list of unique call event identifiers each assigned to a call event. The call event identifiers of Table 2 are numeric strings. However, strings of other characters may be used as unique call event identifiers.

The column labeled "Time Stamp" includes a time stamp associated with each call event, indicating a date and time that the call event occurred. For simplicity, the time stamp is represented in Table 2 as a date only, however, the time stamp may include time of day, sequence number, etc.

In some embodiments, a time stamp is used as the call event identifier. The timestamp may be resolved to a sufficient resolution such that no two timestamps are identical. For example, the resolution of the timestamp may be resolved to an accuracy of seconds, milliseconds, microseconds or less. Alternatively, a sequence number may be appended to a coarse timestamp to uniquely identify each call event. For example, a timestamp resolution of one minute may be used for multiple call events occurring during a given minute. A sequence number representing an order of each call event occurring during the minute may be appended to the timestamps for the respective call events.

A column labeled "Speaker" includes an identification of a speaker who spoke to the enterprise or financial institution. Generally, two speakers communicate with the enterprise, e.g., a fraudster and a legitimate customer. The identity of the speaker may be designated as either "Speaker A" or "Speaker B" based on properties of the speaker voice data without regard to the actual identity of Speaker A or Speaker B as a fraudster or customer. That is initially, it may not be known which speaker (Speaker A or Speaker B) is the fraudster and which is the legitimate customer. The speaker's identity as either Speaker A or Speaker B may be determined for each of the call events before and/or after collecting call events for Table 2.

In some embodiments, there are more than two speakers. For example, more than one legitimate customer speakers may be authorized, such as a parent-child, husband-wife, or family. Similarly, more than one fraudster may call the enterprise regarding the account. In some embodiments, a call event for Speaker A and/or Speaker B may be comprised of multiple voices, such as an agent and a legitimate customer, or an agent and a fraudster. Diarization may be used to remove the agent's voice segments from the call audio data for the call event. The agent voice segments may be removed before or after collecting call events for Table 2.

A column labeled "Notes" includes non-audio data indicating activities associated with respective call event identifiers. These notes may be used for helping an agent or specialist evaluate data in Table 2.

Table 2 is illustrated as sorted according to call event identifier. However, Table 2 may be sorted on other columns. For example, Table 2 may be sorted according to Speaker, which results in clustering together the call events for each speaker. Thus, the call events for Speaker A may be grouped together, the call events for Speaker B may be grouped together, call events for Speaker C may be grouped together, and so on for each of the separately identified speakers.

While Table 2 is illustrated as a table of data, Table 2 may be a database structure or an array in memory, or a hypertext list of pointers and/or links. A table illustrated by Table 2 may be constructed for each of the account numbers in Table 1. Table 2 illustrates a simple call event list including four columns. However, more or fewer columns of data may be included in the call event list. For example, Table 2 may include a column for a score representing a match between a voice sample for a speaker and entries in a blacklist. Similarly Table 2 may include a column for a score representing a match between a voice sample for a speaker and entries in a whitelist. Multiple columns for whitelist and blacklist scores may be used in Table 2. In various embodiments, data in Table 2 includes call audio data such as voice samples, voice models, and channel models, and/or call non-audio data such as agent name, transaction amount, call duration, ANI, etc. Additional examples of call audio data and call non-audio data that may be included in Table 2 is set forth elsewhere herein.

In some instances, a legitimate customer may contact the enterprise after detecting a potentially fraudulent event, for example, after reviewing their billing statement, or not receiving an item ordered from the enterprise. After investigation, a fraud report may include a fraud event reflecting information about the customer contact.

The fraud report may be utilized in the present technology to determine a time frame that is to be analyzed for fraudulent call data associated with the customer account. For example, the account 2134 in Table 1 may be associated with a fraud event dated on June 12. A time period of six months before and three months after the fraud event may be selected. Table 2 then represents call events associated with account 2134 during that period.

In some embodiments, the date of a fraud event may be based on a known call event including an order for goods and services. Data for the fraud event may include one or more voice samples collected during the known call event.

In some embodiments, each time (or according to established business rules for the enterprise) an inbound or outbound telephone call occurs involving an enterprise, telephone call data may be recorded and non-audio data associated with the telephone call may be memorialized in the customer account record by the customer agent facilitating the telephone call. Each inbound or outbound call may be referred to as a call event. A call event may be understood to include both the call audio data associated with a telephone call, as well as the call non-audio data that is determined from the call. Exemplary call non-audio data includes, but is not limited to, a unique identifier for the call event, a timestamp associated with the call event, an automatic number identification (ANI), caller identification information (CID), an international mobile equipment identity number, a given name, an account number, a customer reference number, keywords included in the call event, and combinations thereof. Advantageously, call non-audio data may be collected automatically using various types of equipment within the present technology, or may be collected and recorded by customer service agents. These examples of audio data and/or call non-audio data may be included in the data of Table 2.

The term "call data" for a call event or a segment of the call event may be understood to include not only audio data (e.g., audio signals, or call audio data) for the call event, but non-audio data, such as metadata, for the call event. The term "call audio data" for the call event or segment of the call event may be understood to include the audio portion of the call data (e.g., audio signals). "Call audio data," "audio sample," "audio signal," and "audio data" may be used interchangeably. The above-described examples of audio signal data are to be understood to be non-limiting, and one of ordinary skill in the art will appreciate that many other types of audio signal may likewise be utilized in accordance with the present technology. Additionally, audio information or data may be extracted from call audio data including both speaker models that represent the voice of a speaker and channel models that represent a communication profile of an audio path for a channel used by the speaker. The communications profile may include noise models, background noise, transfer path functions (as will be described in greater detail infra), as well as other representative characteristics that may be determined for a communications channel that would be known to one of ordinary skill in the art.

Examples of non-audio data include a call identification that includes a unique identifier that identifies the call, a source identification (e.g., the phone number the caller called from), a dialed number identification service information (e.g., phone number the caller dialed), an agent identification that specifies the call agent associated with the call event, timestamp-date and time of call, type of call (e.g., subject matter of the call), an account or order identification (e.g., some unique transaction or account identifier that the call was in reference to), and a shipping zip code (e.g., if a product was to be delivered to a particular location), and so forth and any other available data that may be relevant to the call. These examples of non-audio data may be included in the data of Table 2.

Additional examples of non-audio data include in various combinations an automatic number identification that represents the number that initiated a call event, a queue identifier that identifies the telephony queue into which a call event has been directed by the call center 100 (e.g., sales, technical support, fraud review, etc.), a call center identifier that indicates the call center which initially received the call event, and/or the like. These examples of non-audio data may be included in the data of Table 2.

For a call in reference to an account and/or transaction, examples of non-audio data include an account number that specifies the account number that the call event was in reference to, a transaction number that specifies a transaction that the call was in reference to, names associated with the account (first, last, etc), a social security number or other government issued identification number, an address (current and/or previous), telephone number (current and/or previous), email address, account type (business, consumer, reseller, etc.), account opening date, credit limit, list of transactions associated with the account. These examples of non-audio data may be included in Table 2.

Examples of transaction non-audio data include a transaction identifier that uniquely identifies the transaction, a timestamp specifying a date and time for the transaction, a transaction disposition (e.g., change of address, account balance check, account payment details, account plan change, and so forth), a shipping address, and combinations thereof. These examples of non-audio data may be included in Table 2.

For a call in reference to an order, examples of non-audio data include an order number such as a unique order identification, a list of items ordered, an order value, a timestamp, a name, a shipping address, an email address, a phone number, a shipping method, billing details, and combinations thereof. Any of the above non-audio data may be used as call event identifier. These examples of non-audio data may be included in the data of Table 2.

Many types of customer non-audio may be determined from an evaluation of the above mentioned call data. Exemplary types of customer non-audio data include account, transaction, and/or order metadata, along with call non-audio data. Additional data may also be extracted from non-audio data, such as patterns or relationships. These examples of non-audio data may be included in the data of Table 2.

The term "speaker model" may be understood to include a voice model representing unique characteristics of an individual's voice, and/or a language model representing linguistic characteristics of the speaker. The voice model may include a collection of features that are extracted from an audio signal, of the individual's voice, and encoded within a specific statistical framework. In various embodiments, these features include cadence, tone, rate of speech, spectral characteristics, and/or other descriptive information about the voice and vocal tract of the speaker that describes the speaker (separately from the words spoken). Other synonyms for a voice model may include, but are not limited to, a voice model, a voice print, a voice portion of a speaker model, and also in some instances, simply a speaker voice. In various embodiments, the language model is comprised of features or characteristics (such as the words spoken and speech choices made by the speaker) and a statistical framework for encoding those features. Examples of a statistical framework include the probability of an occurrence of a string of words, and how that probability is calculated. In various embodiments, the language model includes language(s) spoken, word choice, word order, accent, grammar, diction, slang, jargon, rate of speech, and/or the like. It is noteworthy that in some instances information in addition to a speaker model (voice model and language model) can be extracted from call audio data. For example, a channel model may be extracted from call audio data, as described elsewhere herein. Further, word spotting or word recognition may be used to extract data, for example, name, account number, social security number, address, and/or the like from call audio data.

In various embodiments, the audio signal includes a voice signal, a channel signal and/or the like. In some embodiments, all callers are recorded automatically, and an audio signal and/or non-audio data is stored for all calls. In other embodiments, a portion of the calls are recorded and/or stored. The stored audio signal may include a voice signal and/or an audio signal. Additionally, the audio signal may be time stamped. Call audio data may be streamed for processing in real time and/or recorded and stored for processing. Automatically recorded audio data may be included in Table 2.

The present technology may also enroll the stored voice signals determined to correspond to a fraudster into a blacklist that includes speaker/channel models determined to be associated with fraudsters. Similarly, the present technology may enroll the stored channel signals determined to correspond to a fraudster into a blacklist that includes channel models determined to be associated with fraudsters. For additional details regarding the enrollment of speaker and/or channel models into a blacklist see, e.g., U.S. patent application Ser. Nos. 11/404,342, 11/754,974, 11/754,975, 12/352,530, 12/856,037, 12/856,118, 12/856,200, 13/415,809, which are all hereby incorporated by reference herein in their entireties.

Because each call event may be time stamped and the fraud report may include time stamp information that approximate a time that a fraudulent event occurred, a fraud analysis may be conducted on call events that are temporally proximate to the fraud event. A comparison may be made between the call data time stamp and the fraud time stamp.

Once call events have been retrieved for the time frame, one or more call data voice samples collected during the call event may be analyzed to determine unique voice models (or voice prints) for each caller in the call events. A timeline may be created and presented visually that indicates each call event occurring during the time frame and the unique voice models associated with each call event. The timeline may be displayed for use of an agent. The timeline may be displayed visually, audibly or in other ways. Differentiation between the unique voice models may be utilized to indicate possible call events linked to a fraudster.

If a voice model for the customer linked to the account exists, the present technology may perform an automatic comparison of each of the unique voice models to the customer voice model and annotate the timeline to indicate unique voice models that do not correspond to the customer voice model.

In some instances, a voice model for a legitimate customer may not be obtained until the legitimate customer calls to investigate a potentially fraudulent event, or when the enterprise contacts the legitimate customer to inform them that a fraudulent event associated with their account has been detected.

Once voice models associated with a fraudster have been disambiguated from one or more voice models associated with one or more legitimate customers, the present technology may then enroll the fraudster into a blacklist that includes records for each fraudster. The record for the fraudster may include not only voice model data but also non-audio data that represents fraudulent events with which the fraudster was associated. For example, the fraudster may be linked to several customer accounts or with a particular communications device.

Optionally, the present technology may also employ techniques such as diarization, to increase the efficacy and speed with which fraudsters are identified. Diarization may allow the present technology to filter out voice models associated with customer service agents (or other individuals with the enterprise). (For additional details regarding diarization, see e.g., U.S. patent application Ser. No. 13/442,767, incorporated herein in its entirety.) Since each customer agent may have a unique voice model, the voice model of the customer agent may be included in the timeline, which may generate superfluous or unwanted noisy data in the timeline. With annotations for the voice models of agents omitted, the timeline may provide a more concise representation of the call events associated with the customer account. Additionally, the aforementioned processes for filtering voice models may equally apply to filtering voice samples.

Figure 1:
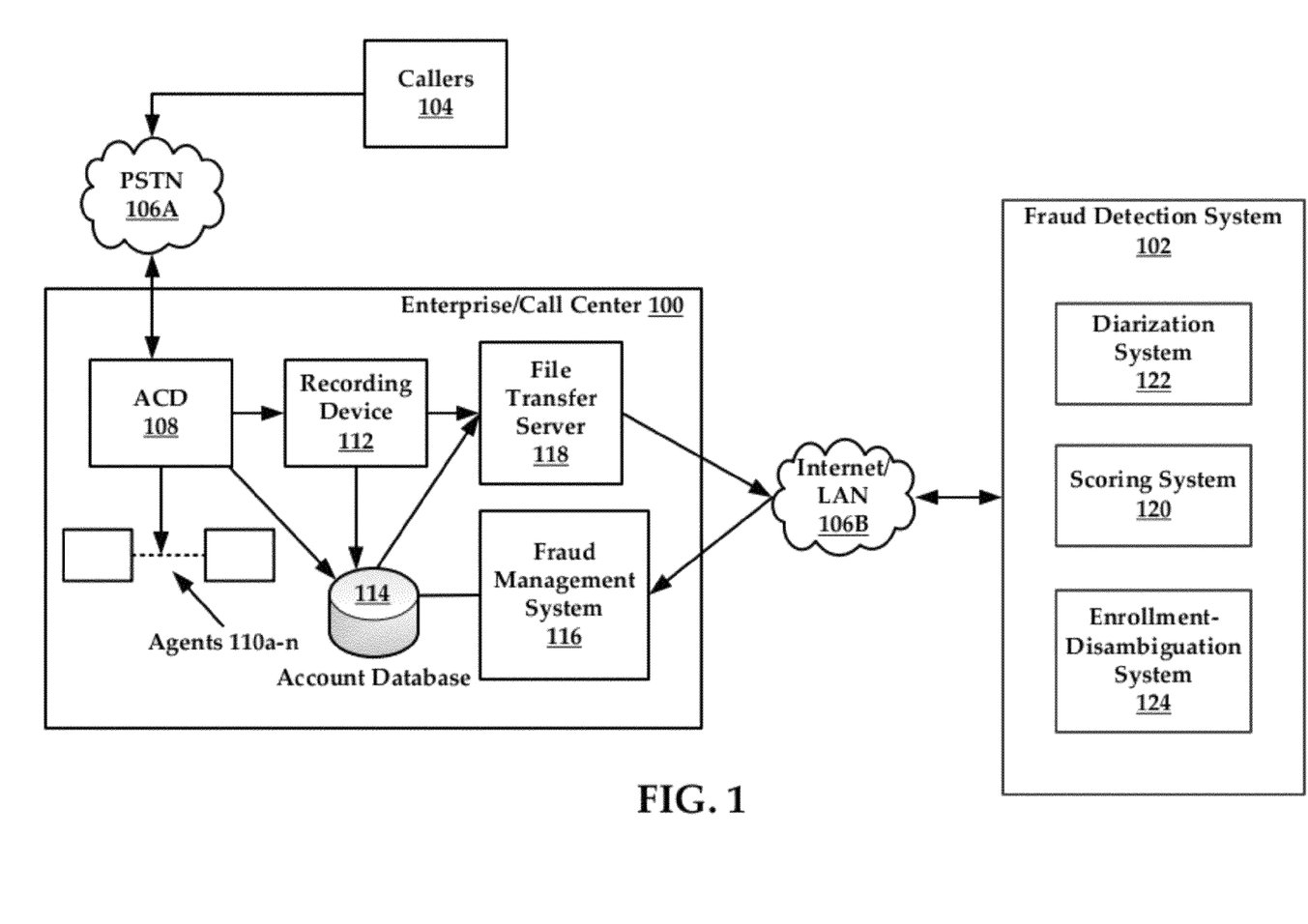
FIG. 1 illustrates an exemplary system for practicing aspects of the present technology.

Referring to FIG. 1, a pictorial representation of an exemplary implementation of a system for fraud detection is shown, in accordance with various embodiments of the present disclosure. As can be seen from FIG. 1, an enterprise call center 100, a fraud detection system 102, and one or more callers 104 are shown. The call center 100 may receive and process calls on behalf of an enterprise.

According to some embodiments, the call center 100 may receive calls from the one or more callers 104 (hereinafter "the callers 104") for goods and/or services provided by the enterprise. The callers 104 may call the call center 100 using various telephonic call paths or channels 106A, including VoIP/Public Switched Telephone Network (PSTN)/mobile network, satellite communications, and/or the like. The calls from the callers 104 may enter an automatic call distributor 108, which distributes calls across one or more individual agents 110a-n. In various embodiments, agents 110a-n are automated system agents and/or people. The automated system agents 110a-n may be configured for voice response and word recognition in processing calls. Voice samples may be captured and/or recorded during the call event using a recording device 112 of the call center 100 and later processed for fraud detection. In some embodiments, the calls events may be streamed and/or processed in real time, with or without recording. It will be understood that the callers 104 may include legitimate customers and fraudsters.

The callers 104 may request call center agents (who receive phone calls) to process transactions related to goods/services. In some embodiments, the call center 100 may apply one or more business rules to decide to call to determine whether to process a transaction directly or to have a fraud check performed on the caller. In some embodiments, all callers are recorded automatically, and call data is generated for all calls, or only a portion of the recorded calls.

Customer accounts for each legitimate customer may be stored in an account database 114. Additionally, call data for call events may be stored in the account database 114 or may be linked to the customer account via a screening identification that associates a particular call event with a customer account. Therefore, both legitimate and fraudulent call events may be linked to the customer account. In some embodiments, call data for call events is stored in a precursor database for enrollment into a fraudster database, see e.g., U.S. patent application Ser. Nos. 11/404,342, 11/754,975 and 12/856,037, incorporated herein in their entirety.

In some embodiments, the call center 100 includes a fraud management system 116 that receives data indicative of potential or actual fraudulent activities from the FDS 102. The fraud management system 116 may utilize the fraud data provided by the fraud detection system 102, along with other enterprise-specific information, to process and remedy fraudulent account activity.

A file transfer server 118 of the call center 100 may communicate recorded call data to the FDS 102 using Internet/LAN 106B. The Internet/LAN 106B may utilize a secure communications protocol. The FDS 102 may perform a fraud check on the caller and may produce a fraud report as described in greater detail below. It will be understood that the FDS 102 may detect any type of fraud; however, for the purposes of brevity, the present disclosure focuses on fraud perpetrated by fraudsters utilizing telephonic devices. While not shown, the FDS 102 may include additional modules or engines that determine fraud and generate fraud reports. Additional details regarding the FDS 102 have been omitted so as not to obscure the description of the present technology.

In various embodiments, the FDS 102 includes a scoring system 120, a diarization system 122, and a disambiguation system 124. Further details regarding the scoring system 120 are described in U.S. patent application Ser. No. 13/415,816, which is hereby incorporated by reference in their entirety herein. Further details regarding the diarization system 122 are described in U.S. patent application Ser. No. 13/442,767, which is hereby incorporated by reference in their entirety herein. The disambiguation system 124 may be utilized to disambiguate call data to detect fraud, or in some embodiment, distinguish legitimate customer voice samples and/or voice models from the voice sample of a fraudster. The operations of the disambiguation system 124 are described in greater detail with regard to FIG. 2.

Figure 2:
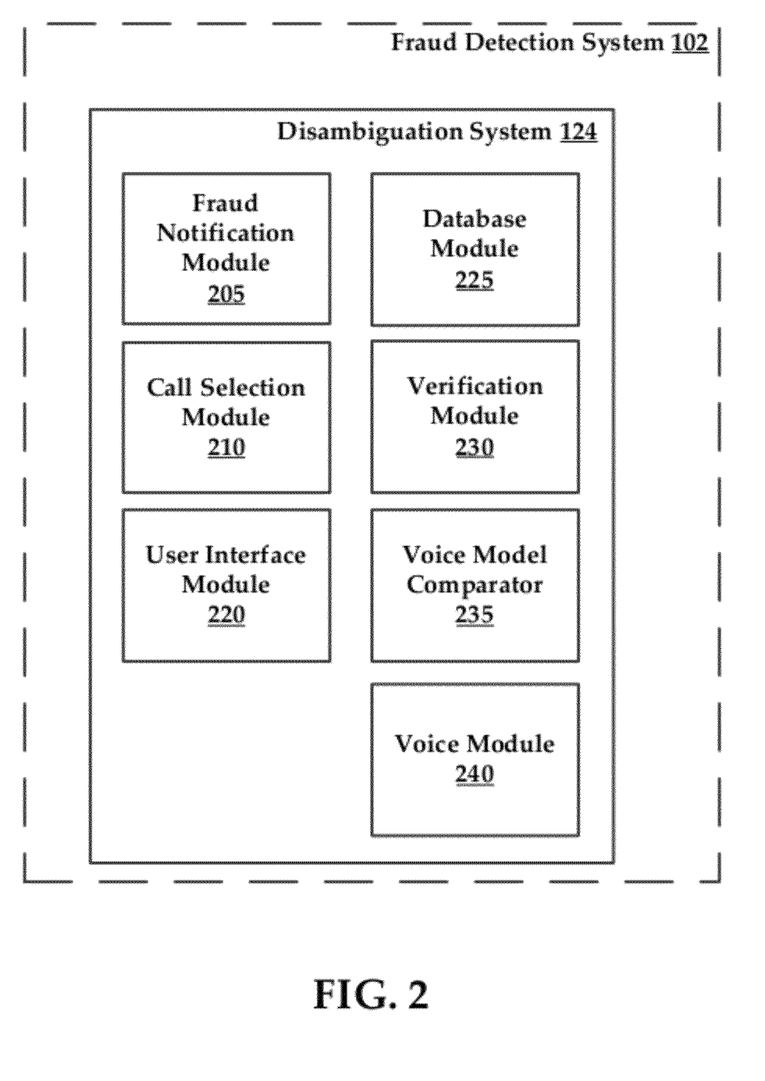
FIG. 2 shows an exemplary architecture of a disambiguation system for use in accordance with the present disclosure.

FIG. 2 is a schematic diagram of an exemplary disambiguation system 124 that includes a fraud notification module 205, a call selection module 210, a user interface module 220, a database module 225, a verification module 230, an voice model comparator 235, and a voice module 240. In some embodiments, the disambiguation system 124 is an application that resides in the memory of the fraud detection system 102 and can be executed by a processor to perform the functionalities attributed thereto.

It is noteworthy that the disambiguation system 124 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational module circuit, and/or other suitable components that provide the described functionality. In some embodiments, individual modules of the disambiguation system 124 may include separately configured web servers.

The fraud notification module 205 may receive a fraud report, a notification of a fraudulent event from the call center 100, or may detect a fraudulent event via the performance of a fraud check within the FDS 102, as described above.

It will be understood that in some embodiments, the notification of the fraud event includes data that links the fraud event to a particular customer account or multiple accounts. Additionally, the fraud event may include a time stamp that represents an approximate time that the fraud event occurred. As discussed supra, it will be understood that a fraud event may be included in a fraud report generated by an enterprise.

In some instances, the notification of a fraud event includes the receipt of a fraud report that includes a plurality of fraud events, or an inbound telephone call from a legitimate customer inquiring about a potentially fraudulent activity associated with their account. Regardless of the mechanism by which notification of a fraud event was received, fraud event data gathered by the notification module 205 may be utilized by the call selection module 210 to gather temporally adjacent call event data from a call data repository. Examples of call data repositories may include the recording device 112 of the call center 100, or the account database 114, FDS 102, and combinations thereof.

Call events may be temporally adjacent to a fraud event when they occur before or after the time stamp associated with the fraud event. That is, the call selection module 210 may obtain call event data for call events that occur before and/or after the time stamp associated with the fraud event. The call selection module 210 may automatically gather call event data for call events occurring for a predetermined time frame that extends from a first point in time before the fraud event, and to a second point in time after the fraud event. The second point in time may correspond to a call event that includes a legitimate customer calling the call center 100 to complain about a potentially fraudulent event.

It will be understood that call events may be obtained from a variety of data sources. In some instances, a direct mapping between a call event associated with fraud and the customer account may not exist. As such, when notification of a fraud event occurs, determining the customer account associated with the fraud event may require evaluating information from a variety of sources such as customer service databases, whitelists, blacklists, CRM systems, and so forth. Thus, a goal for obtaining call event data may require establishing a link between a fraudulent event and call event data occurring temporally proximate or adjacent the fraud event.

Once call event data has been collected, the voice module 240 may parse the call events and apply various algorithms to the voice samples in the parsed data to extract unique voice models therefrom. The voice module 240 may retrieve call audio data related to each call event. If the call audio data includes multiple speakers, the diarization system 122 may separate speakers in the audio stream. In some embodiments, the diarization system 122 may remove audio belonging to agents from the call audio data.

The voice module 240 may identify unique voices and tag each call event with an identity of the speaker determined for the call event. Typically, the collected call events include two speakers, a legitimate customer and a fraudster. In such case, the voice module 240 will generally identify two unique voices comprising two sets of voice samples. The voice module 240 may tag each call event as including a voice sample for the first speaker or the second speaker. However, which of the voice samples belong to the customer and which belong to the fraudster remains to be determined. The scoring system 120 may be configured to determine for each speaker a score representing the probability that the speaker is a legitimate customer. In some embodiments, there may be more than one customer and/or fraudster. A call event may include multiple speakers who are customers and/or multiple speakers who are fraudsters.

Alternatively, the diarization system 122 treats call audio data for each collected call event as a segment of voice data to be diarized. The diarization system 122 may identify multiple segments in a call event. The diarization system 122 may then apply diarization techniques to group segments of call audio data according to unique speakers, each group corresponding to a unique speaker. In some embodiments, the diarization system 122 is also used to tag each call event as including a voice sample of one or more of the identified unique speakers.

Optionally the system 124 utilizes the diarization system 122 to remove audio from the call event data that corresponds to customer service agents. In some embodiments, the disambiguation system 124 may receive a voice model (e.g., from the database module 225) for each customer service agent. The diarization system 122 may use the received voice model to compare the call event audio data to voice models for agents and remove or cull segments of call audio data to filter out customer service agent audio segments from the call event data. Removing the agent segments from the call event data reduces the amount of call event data that is to be analyzed by the system 124, e.g., using the voice module 240.

Similarly, if multiple voice samples or signatures are detected in call event data associated with a single call event, the diarization system 122 may extract unique voice samples or voice models within the call event and group the voice samples or models together. Additionally, multiple agents in a single call event may be similarly determined and/or removed from the audio data.

Once voice samples or models have been generated or determined from the call event data, the user interface module 220 may be executed to generate and/or display a timeline that includes information for each call event determined by the call selection module 210. The timeline may include not only data corresponding to the particular voice samples or models associated with the call event, but also non-audio data associated with the call event. The user interface module 220 may transmit the timeline, e.g., to the agents 110a-n, for use in analyzing call events and/or fraud data. That is, the timeline may be received by the agents 110a-n and displayed to the agents via a graphical user interface. In some embodiments, the agents 110 who handle incoming phone calls are not the same agents as those who review the timeline for determining which voice is a fraudster. The agents who review disambiguation timelines are typically in a different pool of agents from those who handle incoming calls.

Figure 3A:
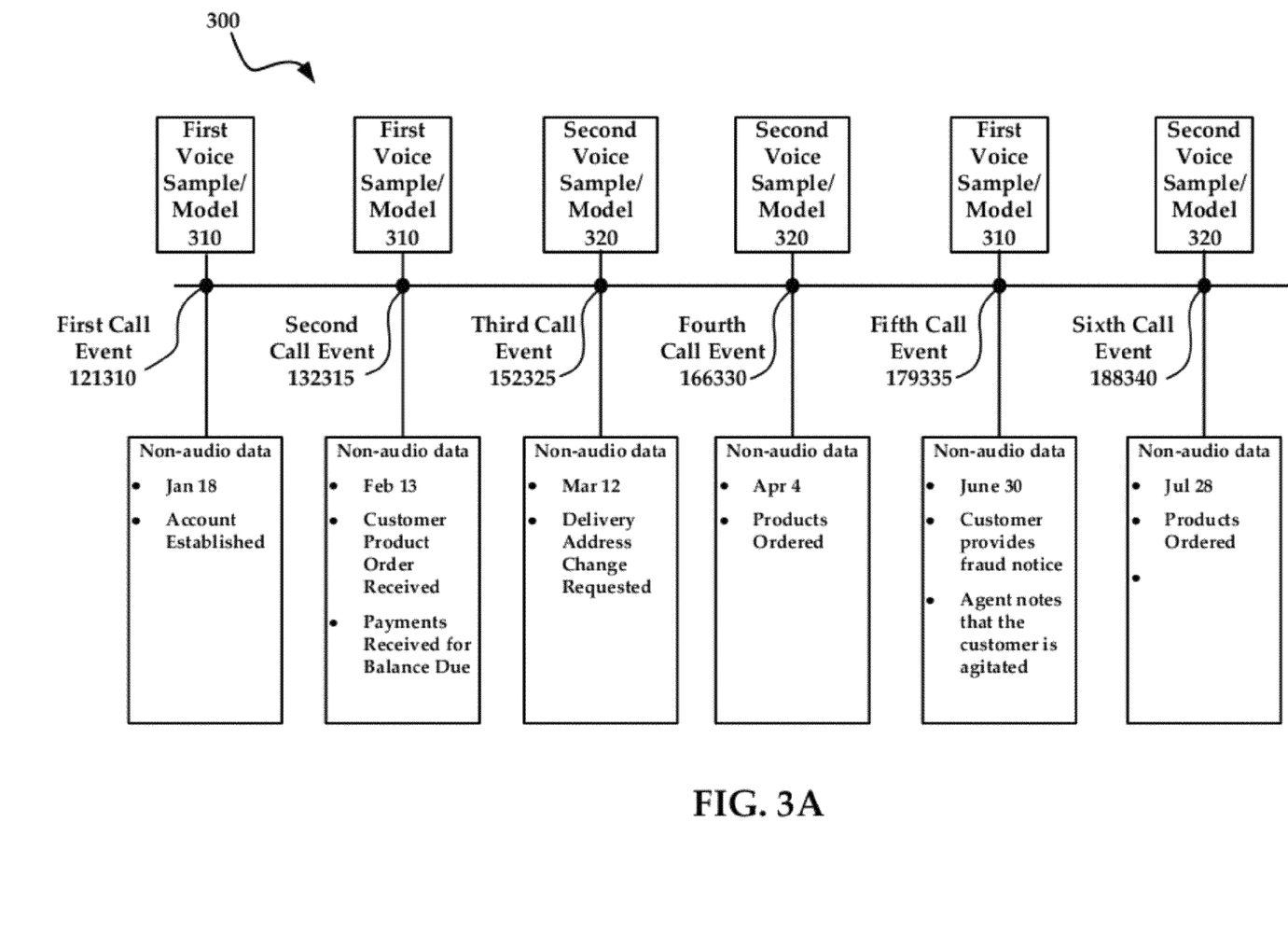
FIG. 3A illustrates an exemplary presentation of disambiguation data in the form of a timeline, in accordance with various embodiments of the invention.

FIG. 3A illustrates an exemplary presentation of disambiguation data in the form of a timeline 300, in accordance with various embodiments of the invention. Timeline 300 may be presented in a visual format. The timeline 300 of FIG. 3A may be used to present the list of call events in Table 2 for review. The timeline 300 may be displayed to fraud detection personnel for providing a means by which the personnel may manually disambiguate the voice samples or models of fraudsters from voice models of legitimate customers to thereby detect the activities of a fraudster.

For example, the timeline 300 indicates that a first voice sample or model 310 was collected during first call event 121310 and a second call event 132315; a second voice sample or model 320 was collected during third call event 152325 and a fourth call event 166330. Further, the timeline 300 indicates the first voice sample or model 310 was again collected during a fifth call event 179335 and the second voice sample or model 320 was collected during a sixth call event 188340. The identification of a voice sample as a unique voice belonging to the first voice or the second voice may be performed using the voice module 240.

The notes indicate that the fifth call event 179335 is an inbound complaint call during which the agitated caller reports fraud on their account. It can, thus, be inferred that the legitimate customer is associated with the first voice model 310 collected during the fifth call event 179335. It can be further inferred that the fraudster is associated with the second voice sample or model 320.

Additional non-audio data associated with the third, fourth, and sixth call events 152325, 166330, and 188340, respectively, may also be used to verify that the second voice sample model 320 is associated with a fraudster. For example, an ANI associated with the third, fourth and sixth call events 152325, 166330, and 188340, respectively, may be associated with a known fraudster. Alternatively, non-audio data in the notes may indicate that the reason for the third call event 152325 was a change of delivery address request, which is a common indicator of fraud. In another example, a score representing a probability of a fraudster voice matches either the first voice or the second voice may be determined using the scoring system 120. Further, the scoring system 120 may be used to predict whether the first or second voice is a fraudster or whether the first or second voice is a legitimate customer. These call events and descriptions are merely exemplary and one of ordinary skill in the art will appreciate that many other types of non-audio data or voice model comparative techniques may likewise be utilized in accordance with the present technology.

Voice samples and/or models may be stored. If voice samples are analyzed above, voice models for the legitimate customer and fraudster may extracted from the respective voice samples. Voice samples, and/or models 310 of the putative legitimate customer may be stored in a database of legitimate customers. Voice samples and/or models 320 of the putative fraudster may be stored in a fraudster database. The voice models may be stored instead of voice samples to conserve storage space.

It will be understood that the timeline 300 is illustrated in FIG. 3A as presented in a visual format, the timeline 300 may include the actual audio data captured for the call events such that clicking on an icon representing the call event may present the audio associated with the call event. That is, a customer agent or fraud detection specialist may easily use the timeline 300 to compare a voice sample or signature of a known fraudster or suspected fraudster with the call audio data.

Figure 3B:
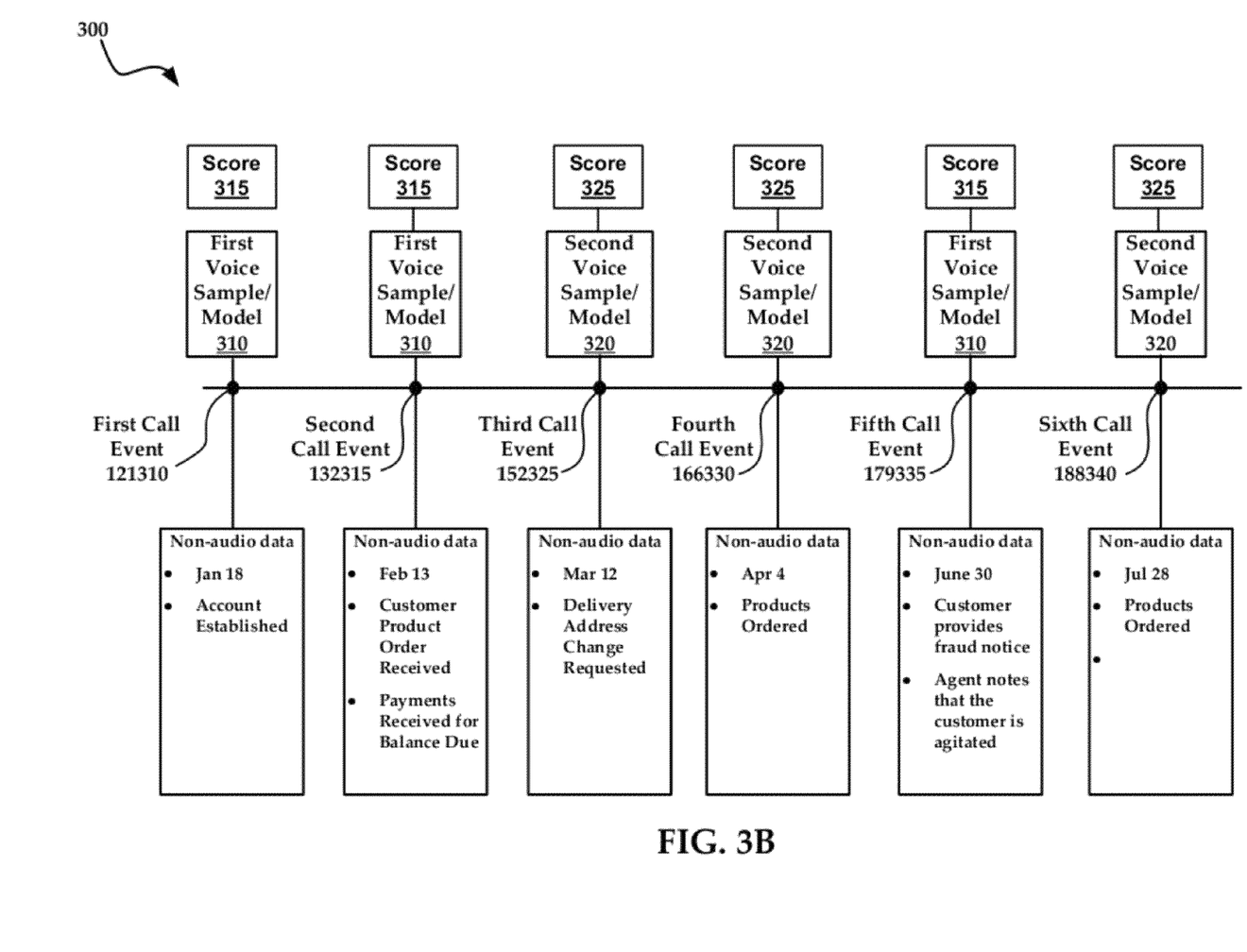
FIG. 3B illustrates an alternative embodiment of the timeline of FIG. 3A.

FIG. 3B illustrates an alternative embodiment of the timeline 300 of FIG. 3A. FIG. 3B differs from FIG. 3A in that FIG. 3B includes a score 315 associated with the first voice sample/model 310 and a score 325 associated with the second voice sample/model 320. The first voice sample/model 310 may be compared to voice models in a fraudster database and a score 315 representing a match may be generated using, e.g., the voice model comparator 235. The score 315 may be used to annotate the timeline presentation to aid an operator in determining if the first voice sample model 310 is from a fraudster. Alternatively, the first voice sample/model 310 is compared to voice models in a whitelist and a score 315 representing a match may be generated using the voice model comparator 235. The score 315 may be used to aid the operator in determining if the voice sample/model 310 is a legitimate caller. In some embodiments, the score 315 includes multiple scores representing comparisons of voice models in one or more blacklists and/or one or more whitelists. In a similar manner, the score 325 represents a comparison of the second voice sample/model 320 to voice models in a whitelist and/or blacklist. The score 325 may include multiple scores representing comparisons of voice models in one or more blacklists and/or one or more whitelists.

The presentation of the disambiguation data in FIGS. 3A and 3B is illustrated as being in the form of a timeline. However, in various embodiments, disambiguation data is presented in other forms including a chart, table, spreadsheet, database, and/or the like. For example, Table 2 above may be presented in the form of a spreadsheet that may be sorted by columns and/or rows. Thus, the spreadsheet representation of Table 2 may be sorted by voice sample to group voice samples together. Similarly, the spreadsheet may be sorted by score for matching fraudster database entries and/or a whitelist entries. Similarly, the spreadsheet may be sorted by event number, timestamp, tag, notes, unique identifier, ANI, CID, international mobile equipment identity number, a given name, customer reference number, keywords included in the call event, and/or the like. The sort may be performed in a hierarchical manner based on various combinations of columns and rows.

Referring back to FIG. 2, once a fraudster has been identified, the database module 225 may be executed to generate a new fraudster record in a blacklist that is stored in a fraudster database. In various embodiments, the fraudster database is associated with the disambiguation system 124, a scoring system, the fraud management system 116, a segmented fraudster database, and/or the like. In some instances, once a fraudster has been detected, non-audio data obtained from call event data associated with the fraudster may be utilized by the database module 225 to link the fraudster to an existing fraudster record in the database. Comparing the fraudster with an existing fraudster record may illustrate that the fraudster has been actively defrauding other accounts. Additionally, patterns determined from fraudster activity may be utilized to predictively determine future customer accounts that may be susceptible to techniques utilized by a particular fraudster.

The fraudster record may also include names utilized by the fraudster, fraudster voice models, channel signatures associated with the fraudster, information indicative of the communications devices/means utilized by the fraudster, call patterns (e.g., time, duration, tone, etc.), known fraudulent activities, and so forth. One of ordinary skill in the art will appreciate that the aforementioned list of the types of data contained in a fraudster record is only exemplary and other types of data which would be known to one of ordinary skill in the art may likewise be utilized in accordance with the present technology.

Also, the database module 225 may link the fraudster record in the blacklist to one or more customer accounts with which the fraudster has utilized. In this way, future fraudulent activities for a customer account may be more efficiently identified as fraud detection agents may utilize past fraudster activity as a basis for analyzing potential or current fraudulent events.

In addition to providing data for generating blacklists with fraudster records, the data provided using the disambiguation system 124 may also be used to generate whitelists that include customer records that may include voice models for the customer along with other information that may properly identify the customer. The disambiguation methods provided herein may substantially prevent customer voice models obtained from call events from being inadvertently enrolled into a blacklist because they happen to be commingled with call data for the same customer account that have been identified as being associated with a fraudster.

It will be understood that a whitelist of legitimate customers may be compromised by having a fraudster voice model enrolled into the whitelist mistakenly, or by passive enrollment. Passive enrollment may include the enrollment of a voice model into the whitelist when the period for fraud detection on the customer account has elapsed. For example, a period for fraud detection may be set to 60 days. However, a fraudulent event may not have been detected during the 60 day detection period. Thus, a voice model for a fraudster who perpetrated the undetected fraudulent event may be inadvertently enrolled into a whitelist.

In some embodiments, multiple legitimate callers account (e.g., a husband-wife, or parent-child) may participate in or initiate call events for the same account. The disambiguation system 124 may utilize a verification module 230 to compare voice models (e.g., using the voice model comparator 235) isolated from call event data that is potentially indicative of a fraudster to voice models or non-audio data included in the blacklist. If the call event data is associated with a potentially indicated fraudster, it may be inferred that voice model in the call event data is, in fact, associated with a particular fraudster. If the voice model or non-audio data for the call event does not correspond to a known fraudster, the call event data may be further analyzed, e.g., using the verification module 230. The analysis may be used to determine if the voice model is a new fraudster that should be enrolled into the blacklist or a legitimate second user, such as a spouse.

One such exemplary method may include the voice model comparator 235 comparing the voice sample or model identified in a call event to a voice model for the customer associated with the account. The voice model for the customer may be created prior to the occurrence of the fraud event, or may be generated when the legitimate customer calls into the call center 100 to complain about a potentially fraudulent activity associated with their account.

If the voice sample or model associated with a call event that is temporally proximate the data of the fraud event and is substantially different from the voice model of the customer, it can be inferred that the voice model is associated with a fraudster and should be enrolled in the blacklist by the database module 225. The voice model comparator 235 may also be adapted to compensate for multiple legitimate customer voice models associated with the single account.

In some embodiments, the voice model comparator 235 is configured to compare the voice sample or model identified in a call event to voice model in a fraudster database, or blacklist. If the voice sample is a substantial match to a voice model in the blacklist, it can be inferred that the voice sample is associated with a fraudster. Similarly, the voice model comparator 235 may compare the voice sample or model identified in a call event to voice model in a whitelist.

Figure 4:
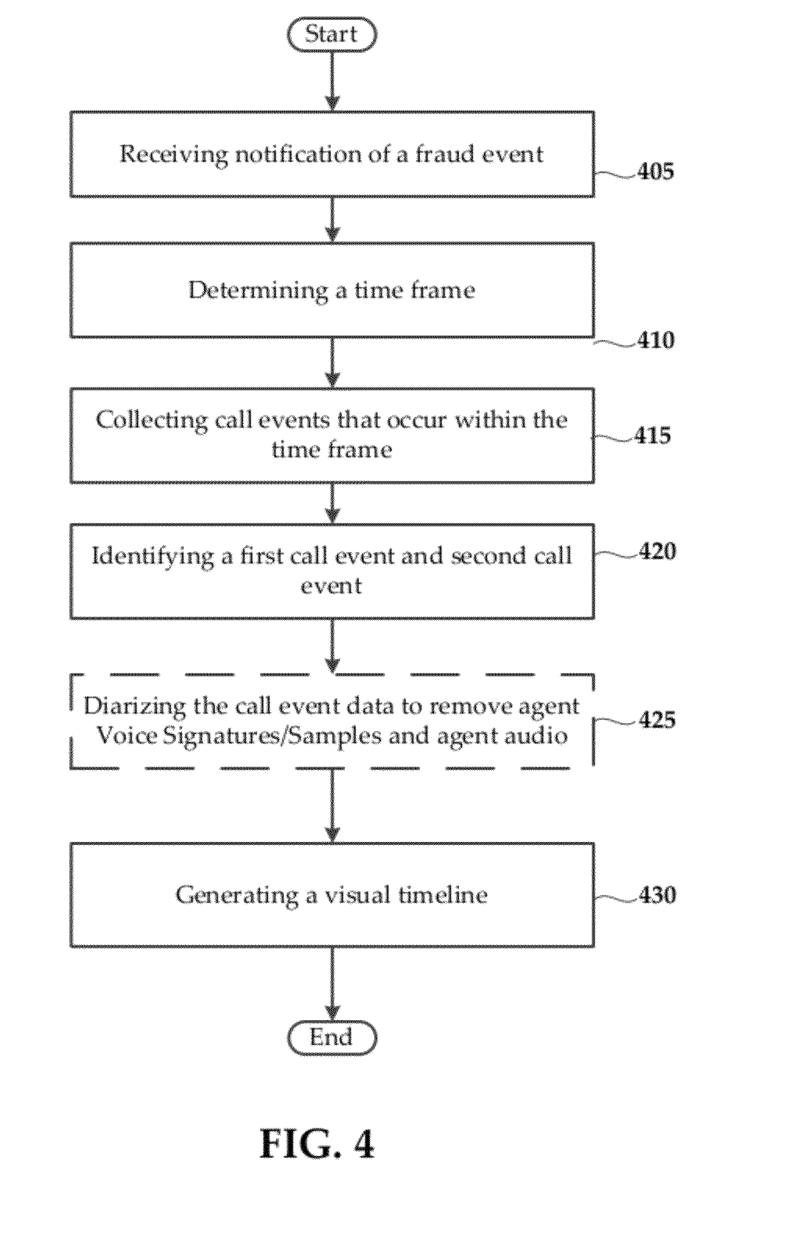
FIG. 4 is a flowchart of an exemplary method for disambiguating call data.

FIG. 4 illustrates a flowchart of an exemplary process for disambiguating call data. The method may be initiated with a step 405 of receiving notification of a fraud event associated with a customer account. It will be understood that in some instances, the fraud event may include information corresponding to the fraud event such as a fraud time stamp that indicates an approximate time when the fraud event occurred.

Next, the method may include a step 410 of determining a time frame that is proximate the fraud time stamp. The time frame may be a predetermined period before and/or after the fraud time stamp. For example, the time frame may include a period 1, 2, 3, 4, 5, 6, 7, 8, 9, 10, 11, 12, or more months or 2, 3, 4, 5, or more years before the fraud time stamp and 1, 2, 3, 4, 5, 6, 7, 8, 9, 10, 11, 12, or more months or 2, 3, 4, 5, or more years after the fraud time stamp.

Next the method may include a step 415 of collecting, using a disambiguation module (e.g., the call selection module 210, of the disambiguation system 124), call events associated with the customer account identifier that occur during the determined time frame, each call event including a unique call event identifier, a voice sample, and a call event time stamp. Call data may be collected from a plurality of call recording devices or databases used to store customer data. The call events may include both the call audio data for the event along with other pertinent information regarding the call event in the form of non-audio data. The call events obtained may fall within the determined time frame that is temporally proximate the fraud event.

After obtaining pertinent call event data, the method may include a step 420 of identifying, using a voice module (e.g., the voice module 240), a first call event and call event timestamp associated with a first voice sample belonging to a first speaker, and a second call event and call event timestamp associated with a second voice sample belonging to a second speaker. Additional call events may be identified as being associated with the first or the second speakers. Some call events may be identified as being associated with a third, fourth, or other speakers.

The method may also include an optional step 425 of diarizing the call event data to remove agent voice models and agent audio. Some call events may include agent voices in the voice samples. The agent voices may be removed from the voice samples using the diarization system 122.

Next, the method may include a step 430 of generating, using a user interface module (e.g., the user interface module 220), a timeline (e.g., presented in a visual format) that includes the first call event and call event timestamp and an identification of the first voice sample as belonging to the first speaker, the second call event and call event timestamp and an identification of the second voice sample as belonging to the second speaker. The timeline may include call events arranged on a timeline in chronological order with an indication of each voice model detected at the call event. Additionally, non-audio data associated with each call event may be displayed proximate each call event on the timeline, or may be accessible by clicking on the call event. Further, a score or confidence estimate representing a likelihood that the first voice sample corresponds to the voice model of the customer and using the first confidence estimate for annotating the first call event may be displayed with the first call event. Similarly, a score or confidence estimate representing a likelihood that the second voice sample corresponds to the voice model of the customer and using the second confidence estimate for annotating the second call event may be displayed with the second call event. Discrepancies in voice models between call events may indicate the presence of fraudster activity.

In some embodiments, methods may not require the generation of a timeline for call events, but may compare unique voice models generated from call audio against a voice model for the customer associated with the customer account. Voice models that do not correspond to the voice model of the legitimate customer may be automatically enrolled in a blacklist, or may be further processed to determine if the voice model is indeed associated with a fraudster.

Figure 5:
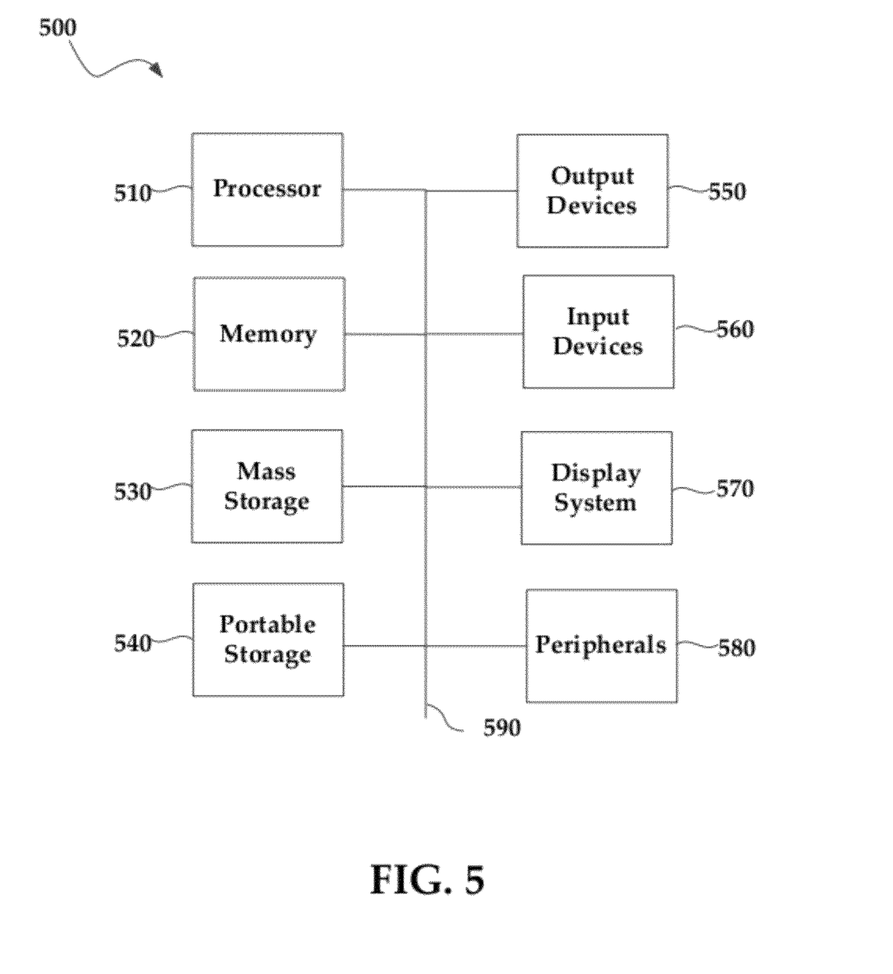
FIG. 5 illustrates an exemplary computing system that may be used to implement embodiments according to the present technology.

FIG. 5 illustrates an exemplary computing system 500 that may be used to implement an embodiment of the present technology. The computing system 500 of FIG. 5 may be implemented in the contexts of the likes of computing systems, networks, servers, or combinations thereof. The computing system 500 of FIG. 5 includes one or more processors 510 and main memory 520. Main memory 520 stores, in part, instructions and data for execution by processor 510. Main memory 520 may store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. The components may be connected through one or more data transport means. Processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present technology for purposes of loading that software into main memory 520.

Portable storage device 540 operates in conjunction with a portable non-volatile storage medium, such as a floppy disk, compact disk, digital video disc, or USB storage device, to input and output data and code to and from the computing system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computing system. Peripheral device(s) 580 may include a modem or a router.

The components provided in the computing system 500 of FIG. 5 are those typically found in computing systems that may be suitable for use with embodiments of the present technology and are intended to represent a broad category of such computer components that are well known in the art. Thus, the computing system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While certain exemplary embodiments have been described and shown in the accompanying drawings, it is to be understood that such embodiments are merely illustrative and not restrictive of the broad disclosure and that this disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method for disambiguating call data, the method comprising:
receiving, via a fraud notification module, notification of a fraud event including a customer account identifier and a fraud time stamp;
determining a time frame that is proximate the fraud time stamp;
collecting, using a call selection module, call events associated with the customer account identifier that occur during the determined time frame, each call event including a unique call event identifier, a voice sample, and a call event time stamp;
identifying, using a voice module, a first call event belonging to a first speaker, and a second call event belonging to a second speaker; and
generating, using a user interface module, a timeline presentation that includes the first call event and call event timestamp and an identification of a first voice sample as belonging to the first speaker, the second call event and call event timestamp and an identification of a second voice sample as belonging to the second speaker.

2. The method according to claim 1, wherein an order of the first and second call events on the timeline is based on the first call event time stamps and second call event time stamps.

3. The method according to claim 1, further comprising identifying, using the voice module, a third call event and timestamp associated with a third voice sample belonging to the first speaker.

4. The method according to claim 3, wherein the timeline further includes the third call event and timestamp and an identification of the third voice sample as belonging to the first speaker.

5. The method according to claim 1, further comprising identifying, using the voice module, a third call event and timestamp associated with a third voice sample belonging to a third speaker.

6. The method according to claim 5, wherein the timeline further includes the third call event and timestamp and an identification of the third voice sample as belonging to the third speaker.

7. The method according to claim 1, further comprising:
comparing the first and second voice sample to a voice model for a customer associated with the customer account identifier;
annotating the first call event based on a match between the first voice sample and the voice model of the customer; and
annotating the second call event based on a match between the second voice sample and the voice model of the customer.

8. The method according to claim 7, further comprising:
generating a first confidence estimate based on the comparison of the first voice sample to the voice model for the customer, the first confidence estimate representing a likelihood that the first voice sample corresponds to the voice model of the customer and using the first confidence estimate for annotating the first call event; and
generating a second confidence estimate based on the comparison of the second voice sample to the voice model for the customer, the
second confidence estimate representing a likelihood that the second voice sample corresponds to the voice model of the customer and using the second confidence estimate for annotating the second call event.

9. The method according to claim 8, further comprising:
storing a first voice model extracted from the first voice sample in a whitelist based on the first confidence estimate; and
storing a second voice model extracted from the second voice sample in a whitelist based on the second confidence estimate.

10. The method according to claim 7, further comprising:
generating a first confidence estimate representing a likelihood that the first voice sample corresponds to the voice model of the customer, and based on the first confidence estimate comparing the first voice sample to voice models in a fraudster database that includes voice models of known fraudsters; and
generating a second confidence estimate representing a likelihood that the second voice sample corresponds to the voice model of the customer and based on the second confidence estimate comparing the second voice sample to voice models in the fraudster database.

11. The method according to claim 10, further comprising:
storing a first voice model extracted from the first voice sample based on the comparison of the first voice sample to voice models in the fraudster database; and
storing a second voice model extracted from the second voice sample based on the comparison of the second voice sample to voice models in the fraudster database.

12. The method according to claim 11, further comprising confirming that the stored first voice model is associated with a fraudster by comparing non-audio data associated with the first call event, wherein the non-audio data includes any of an automatic number identification, caller identification information, an international mobile equipment identity number, a given name, a timestamp associated with the call event, keywords included in the call event, and combinations thereof.

13. The method according to claim 1, further comprising using diarization to the first and second call events to remove agent voice segments by:
detecting voice segments for an agent in the first and second voice samples; and
removing voice segments of belonging to the agent from the first and second voice samples.

14. The method according to claim 13, wherein removed voice segments are omitted from the timeline.

15. The method according to claim 1, wherein each call event comprises a screening identification for associating the call event with the customer account identifier.

16. The method according to claim 1, further comprising grouping call events for substantially similar voice samples into a list, the list comprising a timestamp for each voice sample.

17. The method according to claim 1, further comprising providing, via a graphical user interface, a timeline that includes a first icon representing the first voice sample and a second icon representing the second voice sample.

18. A system for disambiguating call data, the system comprising: a memory for storing executable instructions that disambiguate call data; a processor that executes the instructions;
a fraud notification module stored in memory and executable by the processor to receive notification of a fraud event including a customer account identifier and a fraud time stamp;
a call selection module stored in memory and executable by the processor to determine a time frame that is proximate the fraud time stamp, and collect call events associated with the customer account identifier that occur during the determined time frame, each call event including a unique identifier, a voice sample, and a call event time stamp;
a voice module stored in memory and executable by the processor to identify a first voice sample belonging to a first voice from collected call events and a second voice sample belonging to a second voice from collected call events;
a user interface module in memory and executable by the processor to generate a timeline presentation that includes a first call event and call event timestamp from the collected call events and an identification of a first voice sample as belonging to the first voice, a second call event and call event timestamp from the collected call events and an identification of a second voice sample as belonging to the second voice; and
a scoring module stored in memory and executable by the processor to determine for the first and second voice, a first and second voice score respectively, the first and second voice score each representing a probability of the respective voice being a fraudster.

19. The system according to claim 18, further comprising a user interface module stored in memory and executable by the processor to generate a visual timeline that includes the identification of the first voice sample as belonging to the first voice, and the identification of the second voice sample as belonging to the second voice.

20. The system according to claim 18, wherein the voice module is further executable by the processor to extract a first voice model based on the first voice sample and a second voice model based on the second voice sample.

21. The system according to claim 20, wherein the voice module is further executable to group a first set of call events including voice models substantially matching the first voice model and to group a second set of call events including voice models substantially matching the second voice model.

22. The system according to claim 18, further comprising a voice model comparator stored in memory and executable by the processor to compare the first and second voice sample to a voice model for a customer associated with the customer account.

23. The system according to claim 22, wherein the voice model comparator is further executable to compare the first voice sample against voice models a blacklist that includes voice models of known fraudsters based on the first voice score, and to compare the second voice sample against voice models of known fraudsters based on the second voice score.

24. The system according to claim 22, further comprising:
- a database module that stores agent voice models for comparison to segments of the first and second voice samples; and
- a diarization module stored in memory and executable by the processor to receive agent voice models and remove segments of the first and second voice samples that include agent voices based on the agent voice models.

25. The system according to claim 18, further comprising a database module stored in memory and executable by the processor to identify non-audio data associated with first and second call events that are linked to a fraudster.

26. The system according to claim 25, wherein the non-audio data includes any of an automatic number identification, caller identification information, an international mobile equipment identity number, a given name, a timestamp associated with the call event, keywords included in the call event, and combinations thereof.

27. The system according to claim 18, further comprising a diarization module that diarizes and removes segments of the first and second voice samples associated with agent voice models by:
- segmenting the first and second voice samples;
- detecting segments of voice samples corresponding to an agent in the first and second voice samples, using an agent voice model; and removing the detected segments from the first and second voice samples.

28. The system according to claim 18, wherein each call event comprises a screening identification for associating the call event with the customer account.

* * * * *